(12) United States Patent
Ariel et al.

(10) Patent No.: US 10,225,739 B2
(45) Date of Patent: Mar. 5, 2019

(54) UNIVERSAL REMOTE APPLIANCE LIFECYCLE MANAGEMENT

(71) Applicant: Sure Universal Ltd., Ramat Gan (IL)

(72) Inventors: Viktor Ariel, Modiin (IL); Maria Berezansky, Tel Aviv (IL); Ofer Rotschield, Kiriat Ono (IL); Vadim Lanzman, Petach Tikva (IL)

(73) Assignee: Sure Universal Ltd., Ramat Gan (IL)

( * ) Notice: Subject to any disclaimer, the term of this patent is extended or adjusted under 35 U.S.C. 154(b) by 0 days.

(21) Appl. No.: 15/183,170

(22) Filed: Jun. 15, 2016

(65) Prior Publication Data

US 2016/0366148 A1   Dec. 15, 2016

Related U.S. Application Data

(60) Provisional application No. 62/175,473, filed on Jun. 15, 2015, provisional application No. 62/296,630, filed on Feb. 18, 2016.

(51) Int. Cl.
*H04L 29/06* (2006.01)
*H04W 12/08* (2009.01)
*H04W 88/02* (2009.01)

(52) U.S. Cl.
CPC ............ *H04W 12/08* (2013.01); *H04W 88/02* (2013.01)

(58) Field of Classification Search
CPC ............ H04L 12/2803; H04L 12/2818; H04L 12/282; H04L 12/2809; H04L 12/281; H04L 67/125

(Continued)

(56) References Cited

U.S. PATENT DOCUMENTS

2003/0234737 A1* 12/2003 Nelson ................... G08C 19/28
    341/176
2009/0239587 A1*  9/2009 Negron ............... G06F 3/04883
    455/566

(Continued)

OTHER PUBLICATIONS

Kanma, Hiroshi, et al. "Home appliance control system over Bluetooth with a cellular phone." IEEE Transactions on Consumer Electronics 49.4 (2003): 1049-1053.*

(Continued)

*Primary Examiner* — Syed A Zaidi
(74) *Attorney, Agent, or Firm* — Heidi Brun Associates Ltd.

(57) ABSTRACT

A mobile device, which has internet connectivity and several input/output devices, includes a mobile universal remote controller (MURC) and an appliance lifecycle module. The MURC controls several appliances of different types from different vendors and the lifecycle module provides connectivity between a user of the mobile device and one of several appliance-lifecycle service providers through the input/output devices. An appliance lifecycle management server includes several appliance lifecycle databases, an access controller, and a plurality of flow handlers. The databases receive and store lifecycle information about appliances controlled by the MURCs. The access controller assigns roles and access permissions to the MURC and to server providers that access the server. The flow handlers provide a subset of the information according to the assigned roles and permissions to the MURCs and server providers and include enabling access of a selected service provider to temporarily control one of the appliances via the MURC.

7 Claims, 8 Drawing Sheets (58) Field of Classification Search
USPC .............................................................. 726/4
See application file for complete search history.

(56) References Cited

U.S. PATENT DOCUMENTS

| | | | |
|---|---|---|---|
| 2010/0017736 A1* | 1/2010 | Kim | G08C 17/02 |
| | | | 715/771 |
| 2011/0007018 A1* | 1/2011 | McKinley | G08C 17/02 |
| | | | 345/173 |
| 2012/0066639 A1* | 3/2012 | Hunter | H04L 12/2812 |
| | | | 715/784 |
| 2012/0124245 A1* | 5/2012 | Reeves | G05B 19/0426 |
| | | | 710/8 |
| 2012/0239581 A1 | 9/2012 | Mosher | |
| 2014/0201340 A1 | 7/2014 | Barnhill et al. | |
| 2016/0094702 A1 | 3/2016 | Ariel et al. | |

OTHER PUBLICATIONS

International Search Report for application PCT/IB2016/053543 dated Sep. 27, 2016.

* cited by examiner

UNIVERSAL REMOTE APPLIANCE LIFECYCLE MANAGEMENT

CROSS REFERENCE TO RELATED APPLICATIONS

This application claims priority from U.S. provisional patent applications 62/175,473, filed Jun. 15, 2015, and 62/296,630, filed Feb. 18, 2016, both of which are incorporated herein by reference.

FIELD OF THE INVENTION

The present invention relates to electronic and electrical appliances generally and to a system and method of managing these appliances in particular.

BACKGROUND OF THE INVENTION

Different types of appliances of different brands are generally found in a typical home. Many appliances, such as various air conditioners, televisions, set-top boxes, AV receivers, media streamers, disc players and the like, may be operated by a remote control via infrared (IR), Wi-Fi or the like.

The IR operated appliances may only be operated from a short range while more modern appliances may be equipped with internet connectivity, and if the appliance vendor owns a private cloud connecting all its purchased appliances, each appliance may be accessed from that cloud and may be operated (and possibly serviced) from afar.

SUMMARY OF THE PRESENT INVENTION

There is therefore provided, in accordance with a preferred embodiment of the present invention, a mobile device having internet connectivity and a plurality of input/output devices, the mobile device includes a mobile universal remote controller (MURC) and an appliance lifecycle module. The MURC controls a plurality of appliances of different types from different vendors and the appliance lifecycle module provides connectivity between a user of the mobile device and one of a plurality of external appliance-lifecycle related service providers through the input/output devices.

In addition, in accordance with a preferred embodiment of the present invention, the input/output devices include at least one of: a screen, a microphone, a speaker and a camera.

Moreover, in accordance with a preferred embodiment of the present invention, the appliance lifecycle module includes a plurality of lifecycle elements and a MURC display element forming part of a user interface of the MURC. Each lifecycle element accesses the input/output devices and the internet connectivity provides connectivity. At least one of the lifecycle elements communicates with an appliance lifecycle management server to store and retrieve lifecycle information.

Further, in accordance with a preferred embodiment of the present invention, the lifecycle elements include at least one of: an appliance UI element, an update UI element, an insurance UI element, a maintenance UI element, a review UI element, a disposal UI element, a control UI element, a technician UI element, an authorize UI element, a picture UI element, a video UI element, and a list UI element.

In addition, in accordance with a preferred embodiment of the present invention, the appliance lifecycle module includes an external control authorization unit to enable one of a plurality of external appliance-lifecycle related service providers to temporarily control one of the plurality of appliances via the MURC.

There is also provided, in accordance with a preferred embodiment of the present invention, an appliance lifecycle management server which includes a plurality of appliance lifecycle databases, an access controller and a plurality of flow handlers. The plurality of appliance lifecycle databases receive and store lifecycle information about appliances controlled by a plurality of mobile universal remote controllers (MURCs) each controlling a multiplicity of appliances. The access controller is accessible by the MURCs and by appliance service providers and assigns roles and access permissions to the MURC and to appliance server providers. The flow handlers provide a subset of the lifecycle information stored in the databases according to the defined permissions and roles of the MURCs and the appliance server providers. One of the permissions may include enabling access of a selected appliance service provider to temporarily control one of the plurality of appliances via the MURC.

Moreover, in accordance with a preferred embodiment of the present invention, the plurality of appliance lifecycle databases includes at least one of the following databases: an internet of things (IoT) database, a user database, a user appliance database, a usage database and a service provider database.

In addition, in accordance with a preferred embodiment of the present invention, each MURC is implemented on a mobile device having internet connectivity and a plurality of input/output devices. The input/output devices can include a screen, a microphone, a speaker and a camera. At least a portion of the lifecycle information is provided by the input/output devices.

There is also provided, in accordance with a preferred embodiment of the present invention, an appliance lifecycle method implemented on a mobile device having internet connectivity and a plurality of input/output devices. The method includes controlling a plurality of appliances of different types from different vendors and connecting a user of the mobile device and one of a plurality of external appliance-lifecycle related service providers through the input/output devices.

Further, in accordance with a preferred embodiment of the present invention, the method includes communicating with an appliance lifecycle management server to store and retrieve lifecycle information at least partially generated by the input/output devices.

Still further, in accordance with a preferred embodiment of the present invention, the method includes calling one of a plurality of external appliance-lifecycle related service providers.

Additionally, in accordance with a preferred embodiment of the present invention, the method enables one of a plurality of external appliance-lifecycle related service providers to temporarily control one of the plurality of appliances.

There is also provided, in accordance with a preferred embodiment of the present invention, an appliance lifecycle method implemented on a server. The method includes receiving and storing lifecycle information about appliances controlled by a plurality of MURCs each controlling a multiplicity of appliances, controlling the access to the lifecycle information by assigning roles and access permissions to the MURC and to appliance server providers, and enabling access of a selected appliance service provider to temporarily control one of the plurality of appliances via the MURC.

Finally, in accordance with a preferred embodiment of the present invention, the method also includes the MURC providing at least part of said lifecycle information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that a mobile universal remote control (MURC), implemented on a mobile device, such as a smartphone or a mobile tablet, may be augmented to enable a user to manage the full lifecycle of operations for all of his/her appliances, handling all operations from appliance purchase until its disposal.

One such MURC, controlling many appliance types and brands, and capable of connecting to the internet, is the universal mobile remote controller described in U.S. patent application Ser. No. 14/870,353, filed on Sep. 30, 2015 and assigned to the common assignee of the present application.

Previously, the appliance owner was responsible for all aspects of appliance management, such as keeping the proof of purchase and warranty of each appliance, keeping the remote control of the appliance in working shape, remembering to properly maintain each appliance (cleaning elements, such as an air conditioner filter, replacing fluid, etc.), finding a suitable technician to fix a malfunction, etc.

Applicants have realized that, with an appliance lifecycle manager operating through the MURC, all issues of handling an appliance may be centralized.

Applicants have also realized that the user may utilize the camera, the screen, the speaker, the microphone and the mobile connectivity of the mobile device on which the MURC is installed, to provide all the necessary information during the life of the application, such as when purchasing a new appliance, when communicating with various service providers during the lifecycle of the appliance, and when disposing of it.

Figure 1:
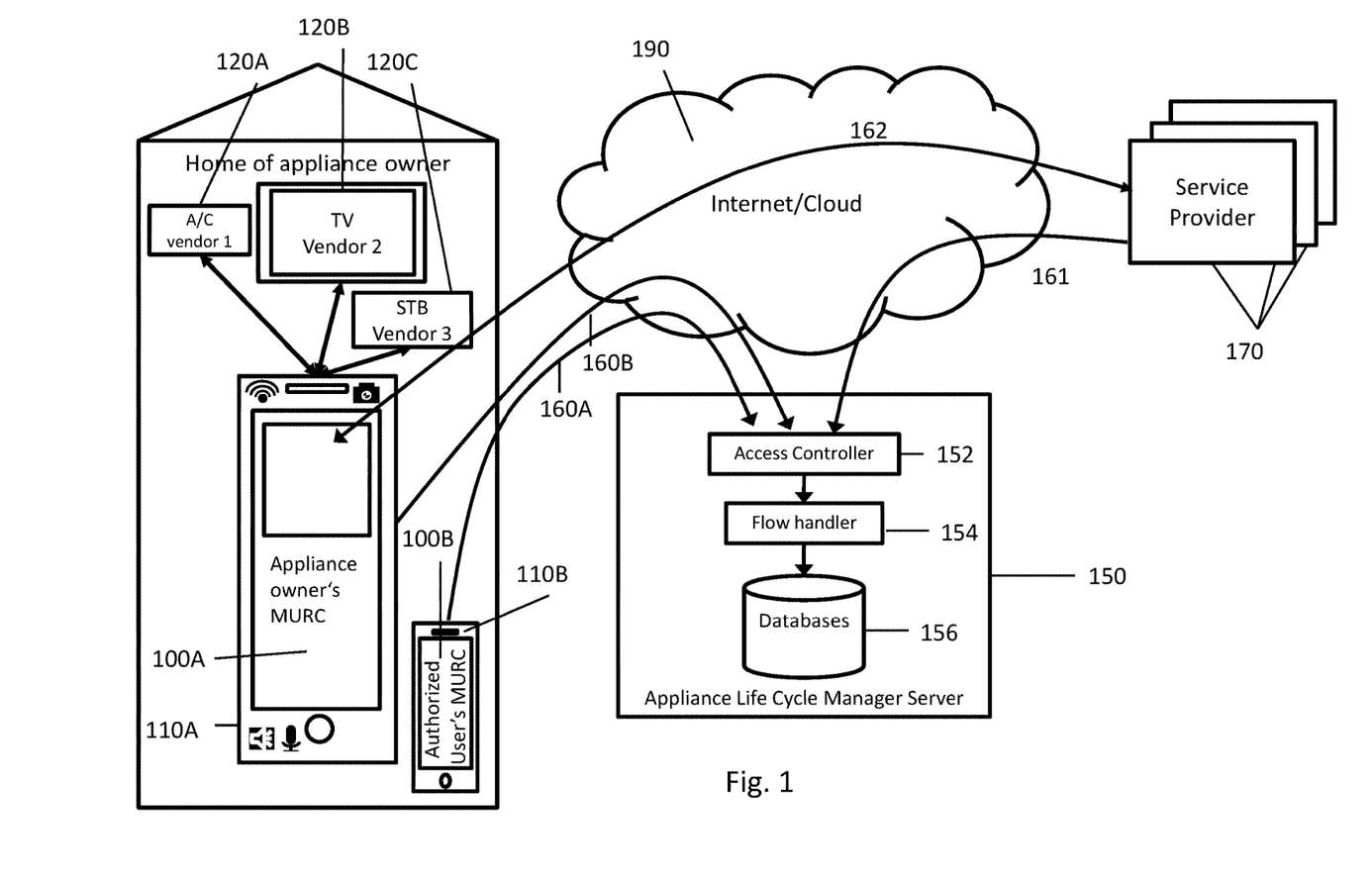
FIG. 1 is a schematic illustration of an appliance lifecycle manager (ALCM) ecosystem.

Reference is now made to FIG. 1 which schematically illustrates an appliance lifecycle manager (ALCM). The ALCM comprises a mobile universal remote control (MURC) 100 installed on a mobile device 110, one or more appliances 120, controlled by MURC 100A, and an ALCM server 150 to manage the life cycle of the appliances controlled by MURC 100.

FIG. 1 shows three exemplary appliances in the home, an air conditioner 120A, a television 120B and a set-top box 120C, where each appliance is manufactured by a different vendor.

FIG. 1 also shows two MURCs 100A and 100B, both of which control the appliances 120. MURC 100A may be installed on a device 110A owned by the appliance owner, while MURC 100B may be installed on another mobile device, labeled 110B, belonging to an authorized user, authorized by the appliance owner. Depending on the authorization levels, the authorized user's MURCs 100B may be capable of fully or only partially controlling some or all of appliances 120.

As discussed in U.S. patent application Ser. No. 14/870,353, MURCs 100 may operate appliances 120 in response to a user's button presses on MURCs 100, either by IR or by WiFi or by any other suitable communication method. MURCs 100 may also provide the button press information along a communication channel 160 to ALCM server 150. MURCS 100 may also receive instructions or other information from ALCM server 150, as described in more detail hereinbelow.

ALCM server 150 may comprise an access controller 152, a flow handler 154 and appliance lifecycle databases 156. ALCM server 150 may store the button press information from MURCs 100 in the relevant database of appliance lifecycle databases 156, as described in more detail hereinbelow. In accordance with a preferred embodiment of the present invention, service providers 170 may request reports, through a communication channel 161, from ALCM server 150, based on the data stored in appliance lifecycle databases 156. Access controller 152 may define the type of information given to both MURCs 100 and service providers 170 and the functionality provided to each communication 160 or 161 is provided by flow handler 154.

Service providers 170 may be any suitable service provider that may provide service to an appliance and or appliance owner, such as a technician to maintain or fix an appliance, an insurance company to provide insurance to one or more appliances, and the like. Each service provider 170 may communicate with ALCM server 150 through a communication channel 161; however access controller 152 and flow handler 154 may control the access to appliance lifecycle databases 156 and may allow access to a different subset of the data stored in appliance lifecycle databases 156 to each service provider.

Communication channels 160 between MURC 100 and ALCM 150, and communication channels 161 between service providers 170 and ALCM 150 may be along any suitable communication channels, such as the internet 190. In accordance with a preferred embodiment of the present invention, when necessary, there may also be a direct communication channel 162 between MURCs 100 and service providers 170. Channel 162 may enable service providers 170 to control appliances 120 by sending commands to MURC 100 that, in turn, may send control commands to appliance 120. Service providers 170 may alternatively also stream video to MURC 100 with instructions to the owner of appliance 120, and MURC 100 may stream video back to service provider 170.

Figure 2:
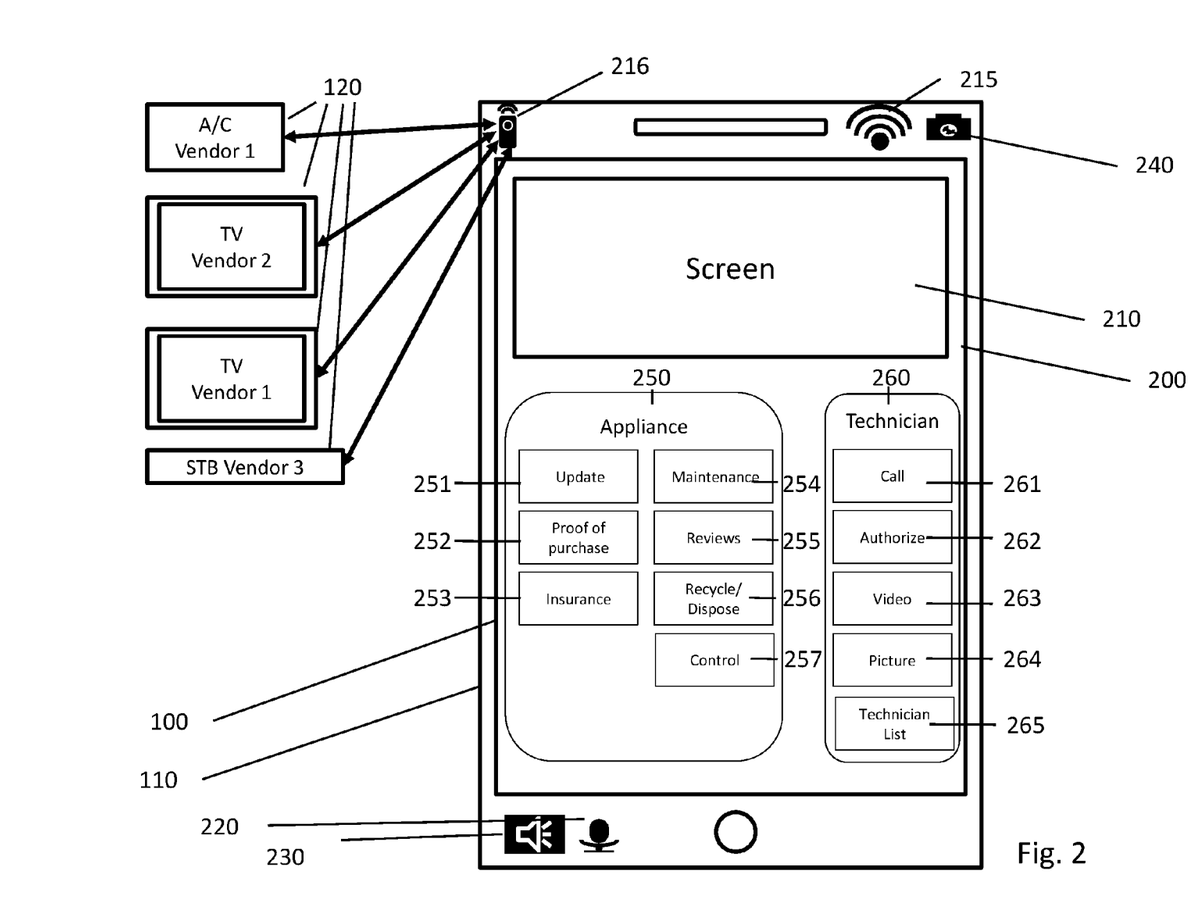
FIG. 2 is a schematic illustration of an appliance lifecycle module forming part of the ALCM ecosystem, the module is part of a mobile universal remote control (MURC) installed on a mobile device.

Reference is now made to FIG. 2 which very schematically illustrates an appliance lifecycle module 200 which is part of MURC 100 installed on mobile device 110. MURC 100 may be a software application for controlling different types of appliances of different brands. Mobile device 110, on which MURC 100 is installed, may be equipped with components such as a display 210, a communication unit 215 (mobile and Wi-Fi), an IR device 216, a microphone 220, a speaker 230, and a camera 240. In accordance with a preferred embodiment of the present invention, MURC 100 may use microphone 220, speaker 230, camera 240 and display 210 of mobile device 110 as input/output elements to service providers 170 and to ALCM 150 during the lifecycle of an appliance.

Screen 210 may be used for displaying photos and videos received from service providers 170. MURC 100 may have access to speaker 220 and microphone 230 that enable the user to speak with service provider 170. It also may utilize camera 240 to take photos and videos and to send them either to ALCM 150 or to service provider 170.

In addition to having access to the built-in components of mobile device 110, MURC 100 may comprise a user interface (UI) that enables the user to manage, activate and perform the different life cycle activities throughout the life of his appliances 120. In an exemplary embodiment, MURC 100 may comprise two main menus: an "appliance" menu 250 and a "technician" menu 260.

In a preferred embodiment of the present invention, appliance menu 250 may comprise the following UI elements: a) "update" 251, which may enable the user to add a new appliance 120 to be controlled by MURC 100, to modify some details of an existing controlled appliance 120 or to remove an existing appliance 120; b) "proof of purchase" 252, which may enable the user to photograph the proof of purchase, the invoice and/or the like and to add the photo to the appliance information; c) "insurance" 253, which may enable the user to purchase or renew an insurance for one of appliances 120; d) "maintenance" 254, which may enable the user to create maintenance events for appliance 120 and to save them in the user's calendar on his mobile device 100; e) "reviews" 255, which may enable the user to create a review regarding appliance 120 read an existing review or find answers for common questions (Q&A) for a specific model; f) "recycle/dispose" 256, which may enable the user to contact companies that deals with recycling, reselling, disposal or the like of appliance 120; and g) "control" 257, which may enable the user to control appliance 120 using IR 216. The UI illustrated in FIG. 2 is a very general schematic illustration, aimed at providing a reasonable understanding of the supported functionality; however, any other UI, with more or less UI elements such as menus, push buttons, text fields and other UI elements, may be supported and may be included in the present invention.

Technician menu 260 may comprise the following UI elements: a) "call" 261, which may enable the user to call a preferred technician or to find a nearby technician; b) "authorize" 262, which may give access rights to some data to a specific service provider 170; and temporary authorization to access MURC 100 in order to externally control an appliance 120 c) "video" 263, which may enable bi-directional video streaming between the user and service provider 170 using camera 240; d) "picture" 264, which may enable the user to take a picture using camera 240 and to send it to service provider 170; and e) "technician list" 265, which may-enable the user to get a list of suggested technicians from which the user may select one to call (using "call" 261).

Since MURC 100 may have screen 210, it may receive data from the cloud and may present it on screen 210 in order, for example, to instruct the appliance owner what to do. MURC 100 may send/stream data to the cloud in order, for example, to send a visual presentation of the appliance's problem and/or vocal evidence, or to film or take a picture of the problem and send the result to the relevant service provider 170. Furthermore, MURC 100 may be used as a mediator or proxy between appliance 120 and the relevant service provider 170 to enable external remote control of an appliance.

Figure 3:
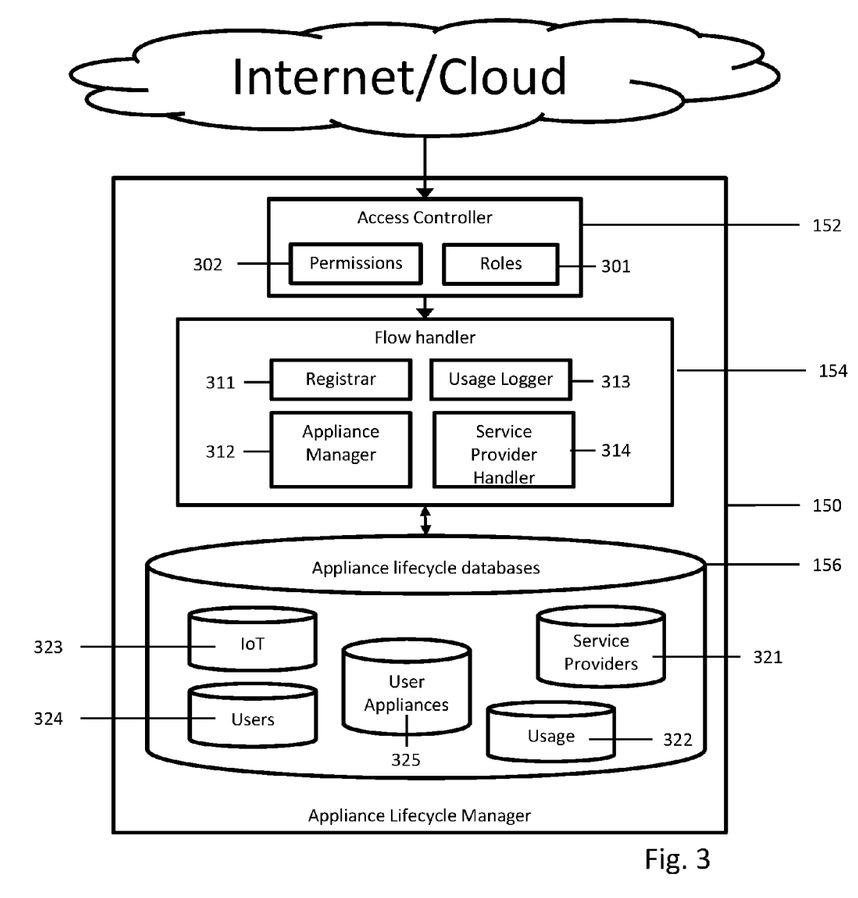
FIG. 3 is a schematic illustration of an ALCM server forming part of the ALCM ecosystem.

While data created in MURC 100 during a technician session in technician menu 260 may be sent to a service provider 170, the data created during an appliance session in appliance menu 250 may be sent to ALCM server 150, as described in more details with respect to FIG. 3, to which reference is now made.

ALCM server 150 may be a platform, residing in the cloud, which is capable of providing lifecycle management for home appliances. ALCM 150 may receive information from a plurality of MURCs 100 regarding the configuration, management, control and maintenance of multiple appliances 120 and may store that information in one or more databases forming database 156. For example, database 156 may comprise an internet of things (IoT) database 323, a user database 324, a user appliance database 325, a service provider database 321 and a usage database 322.

ALCM 150 may store static and dynamic information in appliance lifecycle databases 156. Static information may be stored in IoT database 323. The information provided by IoT database 323 may be appliance related information, needed by each MURC 100 to configure a new appliance. This static data may include information such as types, brands, identification codes, button press codes, etc. which may be provided by the different appliance vendors.

ALCM 150 may also support dynamic, user oriented data in appliance lifecycle databases 156.

User database 324 may include information related to the different users of ALCM 150. This information may be related to the owner of the appliances and to the users that may control those appliances. Owner information may include personal information, such as a user's unique ID, name, address, email, phone number, credentials, etc.; a list of appliances owned by the user; a list of mobile devices owned by the user, etc. User database 324 may also include a list of authorized users associated with a main user, along with their information and privileges, such as the list of authorized appliances, control details (what the user is allowed to do, such as to only change the volume but not to change the station), etc.

User appliance database 325 may include information regarding the appliances owned by the user. User appliance database 325 may include, for each appliance, basic information, such as a unique ID for the appliance, communication type (WWI, IR, etc.), appliance type (TV, projector, AV, air conditioner, disc player etc.), appliance brand (LG, Samsung, SONY, etc.), activation codes, etc. User appliance database 325 may include additional information, such as the appliance name and model, its serial number, date of purchase, warranty information, copy of proof of purchase, and the like.

Usage database 325 may include information regarding the usage of each appliance owned by a user. This information may include the selected appliance, any button press information, including button ID, date and time, selected channel, content watched and any other information that can be captured by MURC 100. If the response from the appliance is available, it may also be stored in usage database 325, including date and time of the response. The information stored in usage database 325 may be used for troubleshooting, monetizing, TV ratings and the like.

Service provider database 321 may store information regarding the different service providers (technicians, reviewers, insurance companies, advertisements, etc.). Each record may include contact information, services provided, recommendations, grade expertise (for techs: LG TV expert, Amana refrigerator expert) and the like.

Appliance lifecycle databases 156 may be of any structure that supports data insertion and retrieval. Appliance lifecycle databases 156 may be any of a relational database, a non relational database, a non SQL database, a big data store, a web server that performs searches and provides search results from the internet and the like. In addition, each database in appliance lifecycle databases 156 may be implemented with a different technology.

Access controller 152 may provide secured and controlled access to the different users of ALCM server 150. Each user, capable of communicating with ALCM server 150, may have different capabilities and rights and may gain access to different parts of the data controlled by ALCM server 150.

ALCM server 150 may support many types of users. One of the users, who may control MURC 100A, may be the owner of all devices 120 in his/her home. Another user may be an authorized user (such as the owner's young child) operating MURC 100B and may have less permissions than user 100A who is the owner of appliances 120. User 100B may, for instance, be able only to turn off or change the volume of TV 120B. In another case, authorized user 100B may only be allowed to change to a small predefined subset of channels in TV 120B (to prevent the child from changing to an adult channel) and so on.

Access controller 152 may include permissions 302 and roles 301. Different users may be assigned different roles such as: appliance owner, authorized user, technician, vendor, reviewer, advertiser, insurance company, content provider and the like. Each role may be assigned a subset of permissions 302 such as diagnostics, maintenance, user operations, fault information, service calls, proof of purchase, costs, reviews and the like.

Each communication channel 160 or 161 may be granted different access rights to database 156. MURC 100A may be able to store a proof of purchase, while MURC 100B may not be able to do that. A TV technician service provider 170 may only get access to usage information for TV appliance 120B.

Access controller 152 may receive communication requests 160 and 161. Access controller 152 may identify the user who may be the source of the communication. It may check the role that is assigned to the user according to roles 301 and check the permissions 302 that may be assigned to that role. According to the communication source, communication type, the roles and the permissions of the sender of the communication, access controller may activate the appropriate flow handler 154. Access controller 152 may pass the user's credentials and its access rights to flow handler 154 which may use this information to determine the databases that the user may access and the fields it may retrieve. For example, MURC 100 may access its personal information stored in user database 324 and in user appliance database 325. MURC 100 may also access similar information of all its authorized users. On the other hand, a technician may only access the usage information of one specific appliance, to which he is about to give service, in usage database 322.

Flow handler 154 may comprise the following handlers: registrar 311, appliance manager 312, usage logger 313, and multiple service provider handlers 314. Each type of user may activate a different handler.

Registrar 311 may handle the registration/de-registration of a user to/from the service provided by ALCM 150. This flow is further described herein below with respect to FIG. 5. Appliance manager 312 may handle the management of an appliance 120. This flow is further described herein below with respect to FIG. 6. Usage logger 313 may handle the usage details of a managed appliance 120. This flow is further described herein below with respect to FIG. 7. ALCM 150 may support numerous service provider handlers 314. Each service provider may have a different flow according to the service it provides. The flow of an insurance company may differ from the flow of a technician; both may be service providers that are supported by ALCM 150. The flow of an exemplary technician is further described herein below with respect to FIG. 8.

The system may support the addition of service providers by adding new roles to roles 301; new permissions to permissions 302 and by creating a new service provider handler 314 to handle the new flow.

Figure 4:
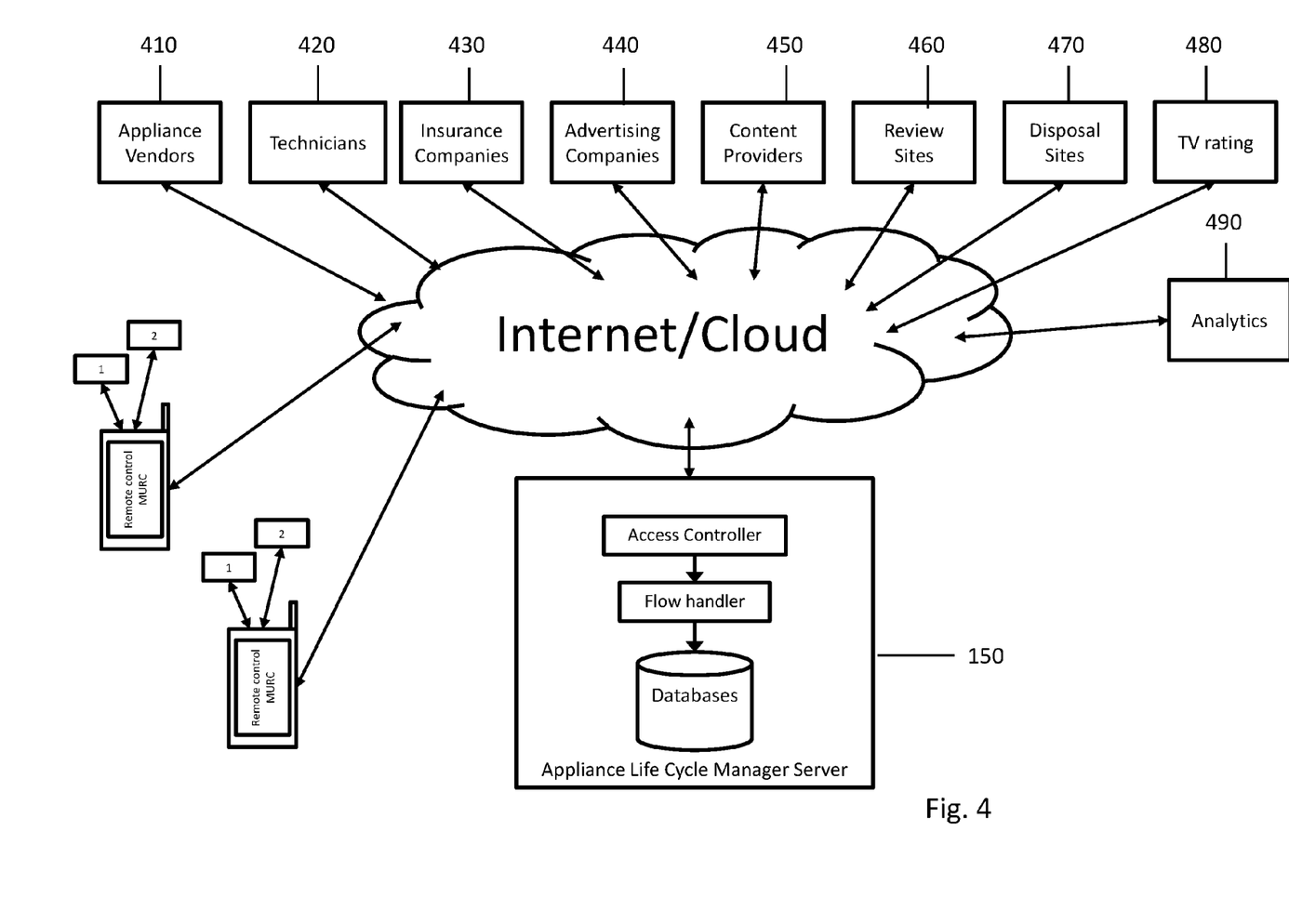
FIG. 4 is a schematic illustration of the connectivity between possible appliance related service providers, the MURCs and the ALCM server.

As can be seen in FIG. 4 to which reference in now made, ALCM 150 may support appliance vendors 410, technicians 420, insurance companies 430, advertising companies 440, content providers 450, review sites 460, disposal sites 470, TV rating 480, analytics 490 and the like.

Appliance vendors 410 may provide installation instructions and support, and or sell new appliances according to information regarding the appliances owned by the user, their age, status, etc.

Insurance companies 430 may provide insurance to appliances. With one button press, MURCs 100 may provide warranty data to the insurance company and/or the insurance companies 430 may provide an extended warranty to an appliance 120 in response. The insurance companies 430 may also provide home insurance by giving an estimate of the value of all appliances owned by the user according to list of owned appliances in ALCM 150.

Advertisers 440 may provide personalized advertisement to users according to their list of owned appliances as stored in user appliance database 325.

Reviewer sites 460 may support writing reviews about a particular appliance owned by a user, as stored in ALCM 150, and reading personal reviews about appliances and reviews created by reviewers.

Disposal sites/recyclers 470 may include resale websites, such as eBay, etc. to list appliances the owner no longer wants and recycling companies to come and get the appliance from the owners' premises, when called. The data about the appliance to be sold may be provided by ALCM 150.

TV ratings 480 may provide accurate TV ratings according to information from usage database 322 that may include, among other data, which channels were selected and the duration between changing channels. In addition, MURC 100 may include an audio/video content recognition unit which may detect the content being watched (like Shazam or Sound hound for songs) and may store this information in usage database 322.

Appliance analytics 490 may provide information about how each user uses his/her appliance and may use any kind of analytics system to analyze the data. This analysis may be particularly useful for appliance vendors to know how often their appliances break down, or are used. As mentioned herein above, the access controller may limit the access of each user to pre-determined databases and information such that information may be provided only to authorized service providers.

Figure 5:
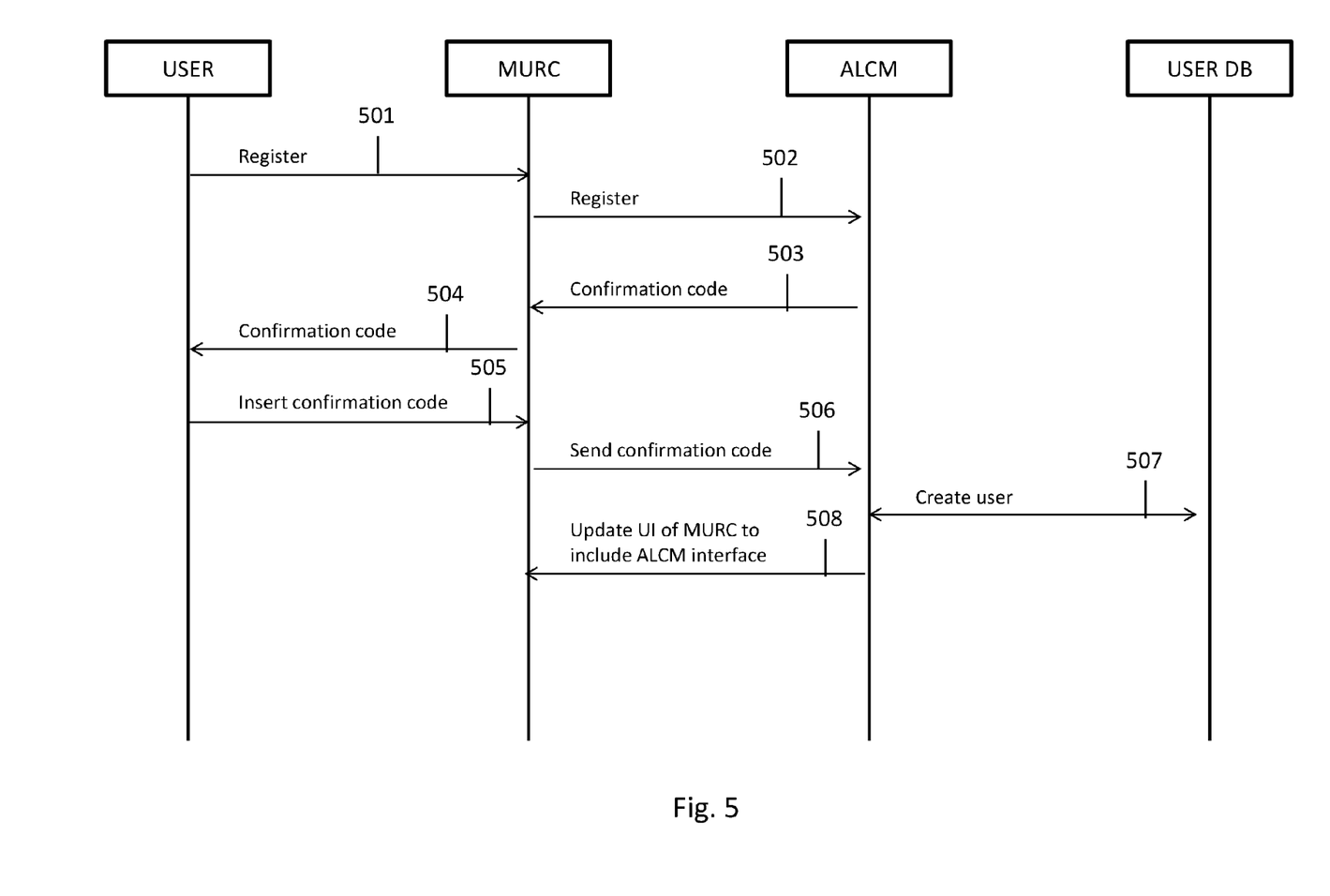
FIG. 5 is an illustration of a registration flow, useful in understanding the operation of the system of FIG. 3.

Reference is now made to FIG. 5, which schematically describes a user registration flow. The registration flow involves a user, his/her MURC 100, ALCM 150 and user database 324. The user may register (501) to the service— i.e. may activate the relevant UI elements in his MURC 100. MURC 100 may send (502) the register request with all needed information to ALCM 150. ALCM 150 may respond (503) with a confirmation code to ensure that the request is a genuine request and not fraudulent. The code may also be used to authenticate the user and validate the contact information stored in users database 324 such as his email address or phone number. The confirmation code may be sent (504) to the user via any suitable means, such as SMS, email etc. It may also be sent to the MURC installed on the user's device and displayed on its screen 210 and may be visible to the user. The user may enter (505) the received code into the MURC which, in turn, may send (506) it to ALCM 150. ALCM 150 may create (507) a new user in user database 324 and may send (508) an updated UI to the MURC 100 to include the additional UI elements 250 and 260 supported by the ALCM 150.

Figure 6:
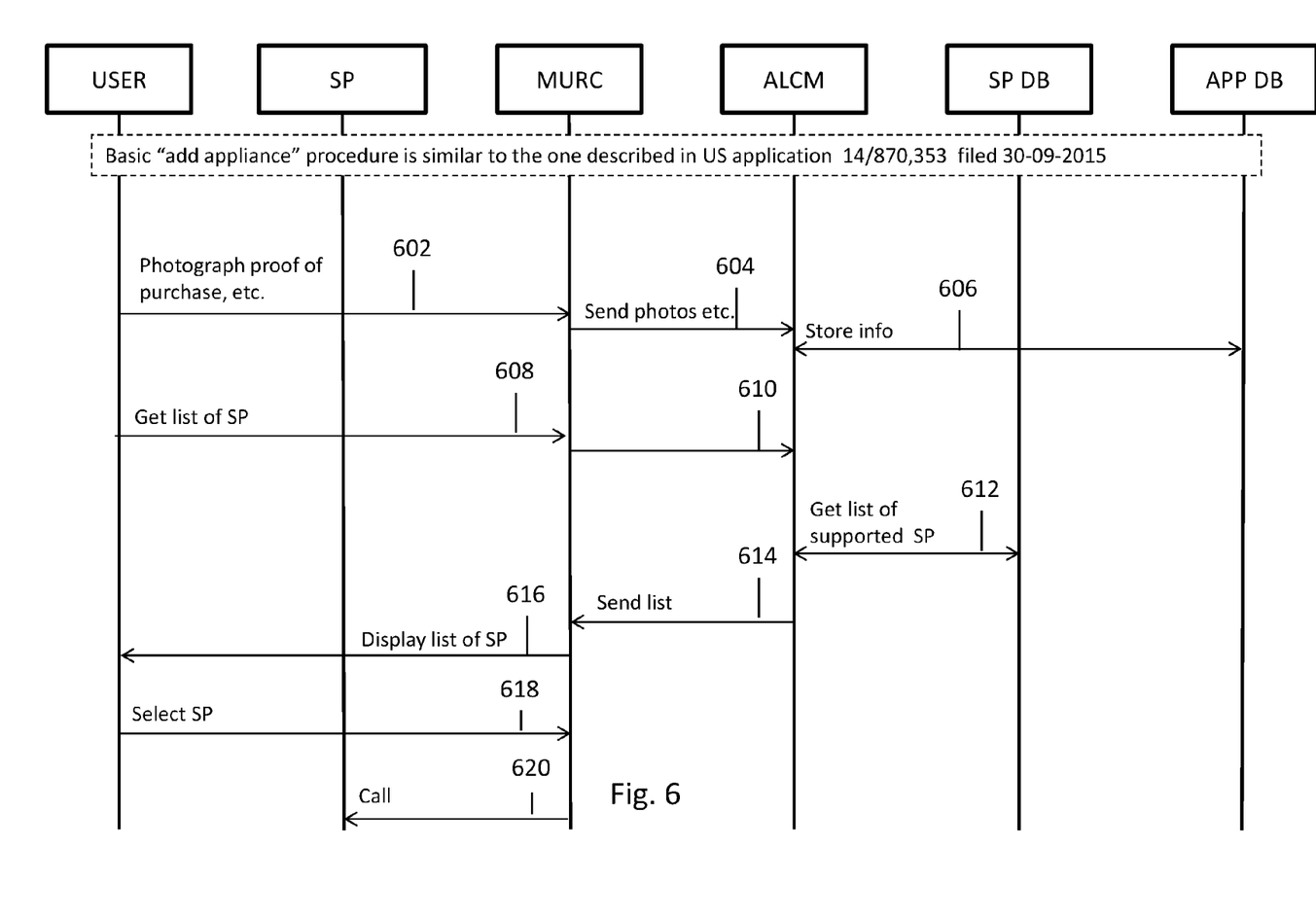
FIG. 6 is an illustration of an add appliance flow, useful in understanding the operation of the system of FIG. 3.

Reference is now made to FIG. 6, which schematically describes the appliance management flow. This flow involves a user, a service provider SP 170, a MURC 100, ALCM 150, service provide database (SP DB) 321 and appliance database (APP DB) 325. The basic add appliance procedure is similar to the procedure described in U.S. application Ser. No. 14/870,353, described hereinabove. In addition, once the user registers to the ALCM service, he may use his MURC 100 to photograph (602) the proof of purchase. MURC may send (604) the photo to ALCM which may store (606) it in the appliance database APP DB. The user may want to buy insurance for the new appliance 120 and may ask (608) for a list of insurance companies. MURC 100 may send (610) the request to ALCM 150 that may retrieve (612) a list of recommended insurance companies from the service providers database SP DB. ALCM 150 may then send (614) the list to MURC that may display (616) it on the screen 210 to be available to the user. The user may select (618) an insurance company in MURC 100 and MURC 100 may initiate (620) a call to the insurance company representative SP. The insurance company in the flow described herein above is one example of many of a service provider that the user may want to contact during the life cycle of an appliance 120.

Figure 7:
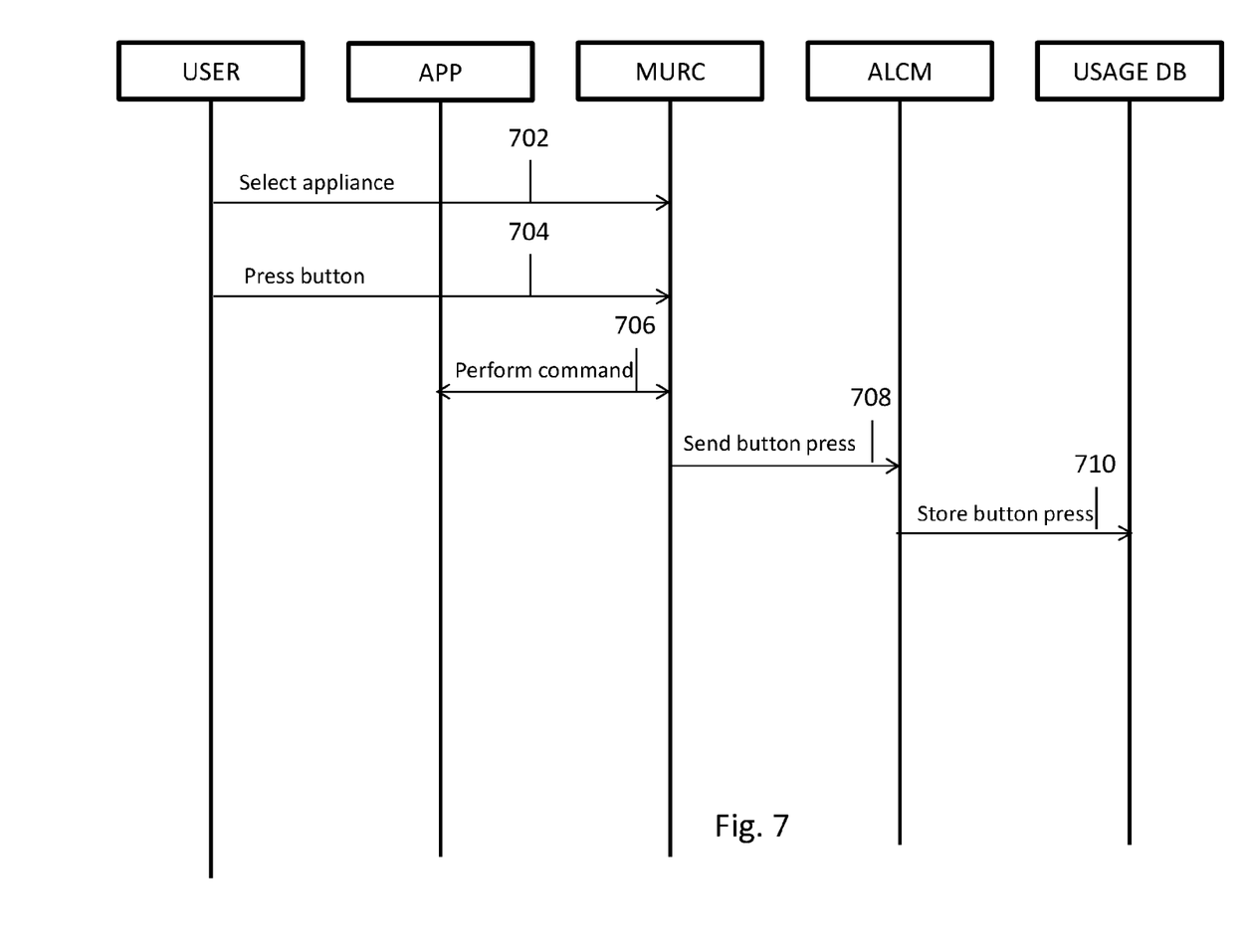
FIG. 7 is an illustration of a usage flow, useful in understanding the operation of the system of FIG. 3.

Reference is now made to FIG. 7 that very schematically describes the appliance usage flow. This flow involves a user that activates an appliance APP 120, a MURC 100, an ALCM 150, and a usage DB 322. The user may select (702) an appliance 120 he may wish to control using MURC 100. The user then may press (704) one of the buttons to perform the wanted functionality on the selected appliance. The selected appliance may be a TV and the selected button may be to turn on the TV. MURC 100 may send (706) the command to appliance 120. In addition MURC 100 may send (708) the command along with the appliance on which it was performed to ALCM 150. If appliance 120 responded to MURC 100, the response may also be sent to ALCM 150 during communication 708. ALCM 150 may store (710) all information in USAGE DB.

Figure 8:
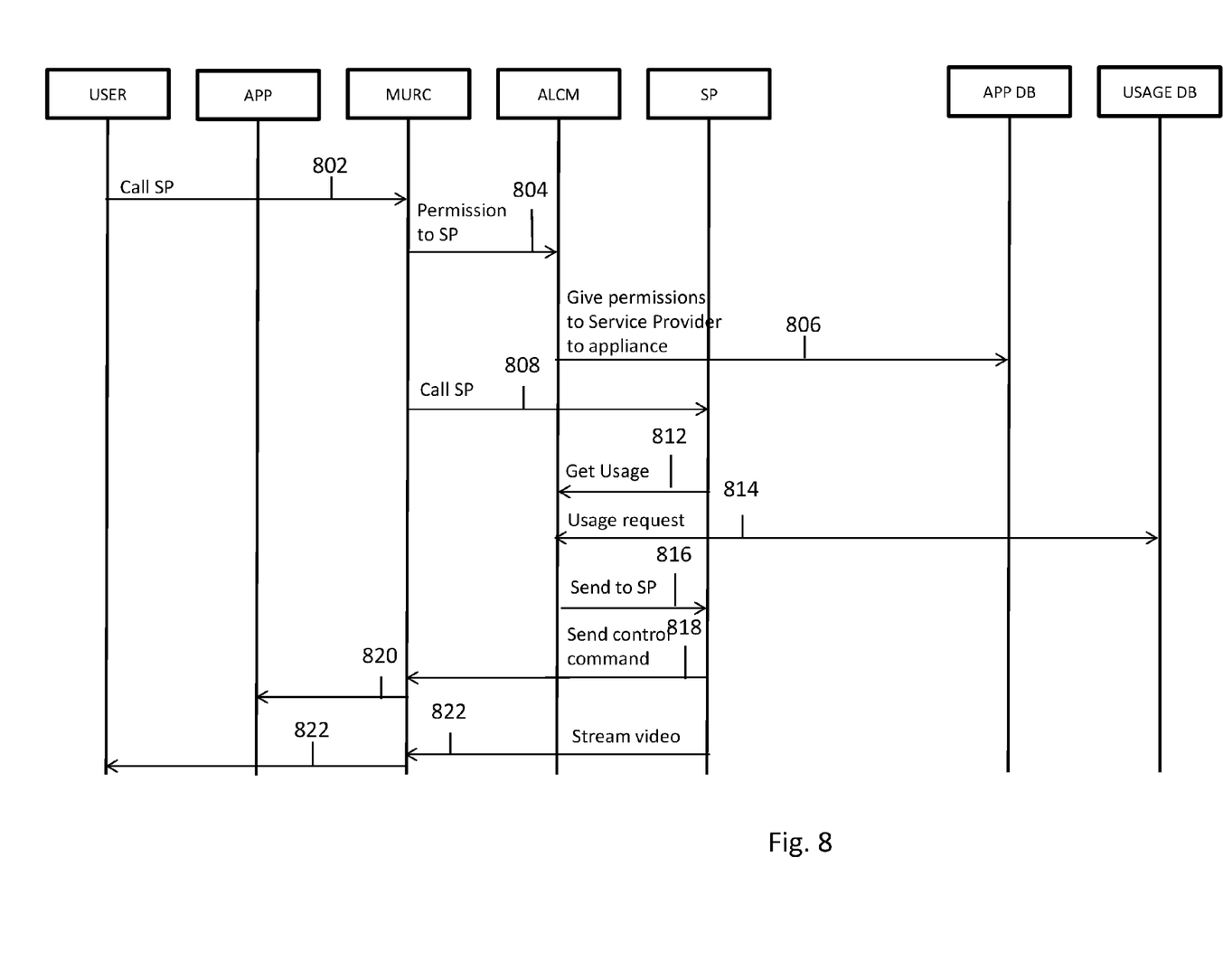
FIG. 8 is an illustration of a call for service flow, useful in understanding the operation of the system of FIG. 3.

Reference is now made to FIG. 8 that very schematically describes a call for technician flow. This flow involves a user that may call a service provider to fix some problems of an appliance 120; an appliance 170, a MURC 100, an ALCM 150, a service provider 170 technician in this case, appliance DB 325 and usage DB 322. The user may select (802) a specific service provider to give service to a malfunctioning appliance. MURC 100 may ask (804) ALCM 150 to give permissions to the service provider to access the specific appliance 120. ALCM 150 may update (806) the appliance DB 325 with the new permission. MURC 100 may call (808) the service provider 170 and may specify the problems he encounters with appliance 120. The service provider 170 may ask (812) for usage information from ALCM 150, which may retrieve (814) the needed information from usage DB 322 and may send (816) the received information to SP 170. The service provider 170 may deduce from the received information what the problem is, and may send (818) a control command to MURC 100 that may send (820) it further to the appliance 120. The command may or may not solve the problem, and the service provider 170 may further stream (822) video to MURC 100 that may display (822) it to the user who may try to do as instructed in the received video (clean the AC filter for example).

It may be appreciated that ALCM 150 described herein above may provide an appliance-centric ecosystem that may provide all needed functionality in the life cycle of appliances 120 controlled by a MURC 100. A user may access all the service providers 170 for his/her appliances through his MURC 100, which he generally has with him. In addition to the benefits for the appliances owner, ALCM 150 may provide real data, about how users use their appliances, which can be usefully utilized by different service providers 170 such as appliance vendors, insurance companies etc. Moreover, ALCM 150 may enable servicers 170 to externally (in addition to remotely) access the appliances 120, through the internet even though the appliances themselves may not be directly connected to the cloud as MURC 100 may become a proxy between any servicer 170 and any appliance 120 as the system may provide connectivity of service provider 170 to appliances 120 via the MURC 100 installed on the user's mobile device 110.

It may be appreciated that the flows described herein above may be implemented with more or less elements and requests and the described flows are only one possible way to implement the needed functionality.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An appliance lifecycle management server comprising:
   a plurality of appliance lifecycle databases to receive and store lifecycle information about appliances operated by users via a plurality of mobile universal remote controllers (MURCs) each of which enabling a user to operate a multiplicity of appliances,
   an access controller accessible by said MURCs and by appliance service providers, said access controller to assign roles and access permissions to said MURC and to appliance server providers; and
   a plurality of flow handlers to provide a subset of said lifecycle information stored in said databases according to said defined permissions and roles of said MURCs and said appliance server providers,
   wherein one of said permissions includes enabling access of a selected said appliance service provider to temporarily operate one of said plurality of appliances via said MURC.

2. The appliance lifecycle management server according to claim 1 and wherein said plurality of appliance lifecycle databases comprises at least one of the following databases: an internet of things (IoT) database, a user database, a user appliance database, a usage database and a service provider database.

3. The appliance lifecycle management server according to claim 1 and wherein each said MURC is implemented on a mobile device having internet connectivity and a plurality of input/output devices, the input/output devices comprising a screen, a microphone, a speaker and a camera, wherein at least a portion of said lifecycle information is provided by said input/output devices.

4. An appliance lifecycle method implemented on a server, the method comprising:
   receiving and storing lifecycle information about appliances controlled by a plurality of mobile universal remote controllers (MURCs) each controlling a multiplicity of appliances,
   controlling the access to said lifecycle information by assigning roles and access permissions to said MURC and to appliance server providers;
   providing a subset of said lifecycle information according to said defined permissions and roles of said MURCs and said appliance server providers; and
   enabling access of a selected said appliance service provider to temporarily control one of said plurality of appliances via said MURC.

5. The appliance lifecycle method according to claim 4 and wherein said lifecycle information comprises at least one of the following information types: internet of things (IoT) information, user information, user appliance information, usage information and service provider information.

6. The appliance lifecycle method according to claim 4 and also comprising said MURC providing at least part of said lifecycle information.

7. The appliance lifecycle method according to claim 4 wherein said appliance service providers comprise at least one of: an appliance vendor, an appliance technician, an appliance insurance company, an advertiser, a content provider, an appliance review company, a disposal company, a TV rating company and an analytics company.

* * * * *